United States Patent
Kurz

(10) Patent No.: US 11,644,037 B2
(45) Date of Patent: May 9, 2023

(54) SIDE-CHANNEL COMPRESSOR FOR A FUEL CELL SYSTEM FOR CONVEYING AND/OR COMPRESSING A GASEOUS MEDIUM

(71) Applicant: Robert Bosch GmbH, Stuttgart (DE)

(72) Inventor: Michael Kurz, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 17/296,323

(22) PCT Filed: Nov. 11, 2019

(86) PCT No.: PCT/EP2019/080790
§ 371 (c)(1),
(2) Date: May 24, 2021

(87) PCT Pub. No.: WO2020/104225
PCT Pub. Date: May 28, 2020

(65) Prior Publication Data
US 2022/0049704 A1    Feb. 17, 2022

(30) Foreign Application Priority Data
Nov. 22, 2018   (DE) .................. 10 2018 219 995.7

(51) Int. Cl.
*F04D 17/10*    (2006.01)
*F04D 23/00*    (2006.01)
(Continued)

(52) U.S. Cl.
CPC ........... *F04D 17/10* (2013.01); *F04D 23/008* (2013.01); *F04D 29/023* (2013.01);
(Continued)

(58) Field of Classification Search
CPC ...... F04D 17/10; F04D 23/008; F04D 29/023; F04D 29/266; F04D 29/284; F04D 29/4206; F05D 2300/43; H01M 8/04111
See application file for complete search history.

(56) References Cited

U.S. PATENT DOCUMENTS 4,194,798 A  *  3/1980  Schonwald ........... F04D 29/059
                                                  415/55.1
4,204,802 A  *  5/1980  Schonwald ........... F04D 23/008
                                                  415/55.1
(Continued)

FOREIGN PATENT DOCUMENTS

DE     731022 C    1/1943
DE     733433 C    3/1943
(Continued)

OTHER PUBLICATIONS

Translation of International Search Report for Application No. PCT/EP2019/080790 dated Feb. 4, 2020 (3 pages).

*Primary Examiner* — Brian P Wolcott
(74) *Attorney, Agent, or Firm* — Michael Best & Friedrich LLP

(57) ABSTRACT

The invention relates to a side-channel compressor (1) for a fuel cell system (37) for conveying and/or compressing a gaseous medium, in particular hydrogen, comprising a housing (3); a compressor chamber (30) which is situated in the housing (3) and which has at least one encircling side channel (19, 21); a compressor impeller (2) which is situated in the housing (3) and which is arranged so as to be rotatable about a rotational axis (4), wherein the compressor impeller (2) has conveying cells (5) arranged on the impeller circumference in the region of the compressor chamber (30); and in each case one gas inlet opening (14) formed on the housing (3) and one gas outlet opening (16), which are fluidically connected together via the compressor chamber (30), in
(Continued)

particular the at least one side channel (19, 21). The housing (3) has a respective first and second end face (32, 34) radially to the rotational axis (4), each end face facing the compressor impeller (2), and a first and second functionally relevant gap dimension (36, 38) is formed in the region of each gap surface. According to the invention, the compressor impeller (2) is designed in multiple parts and has a first impeller shell (10) and a second impeller shell (12). The impeller shells (10, 12) are arranged adjacently to each other axially to the rotational axis (4) in particular, and each impeller shell is at least partly made of a plastic.

17 Claims, 5 Drawing Sheets

(51) Int. Cl.
*F04D 29/02* (2006.01)
*F04D 29/28* (2006.01)
*F04D 29/42* (2006.01)
*H01M 8/04111* (2016.01)
*F04D 29/26* (2006.01)

(52) U.S. Cl.
CPC ......... *F04D 29/266* (2013.01); *F04D 29/284* (2013.01); *F04D 29/4206* (2013.01); *H01M 8/04111* (2013.01)

(56) References Cited

U.S. PATENT DOCUMENTS

| | | | | |
|---|---|---|---|---|
| 4,408,952 A * | 10/1983 | Schweinfurter | ........ | F04D 5/005 415/55.1 |
| 4,992,022 A * | 2/1991 | Aust | ..................... | F04D 29/288 415/55.1 |
| 5,248,238 A * | 9/1993 | Ishida | ................... | F04D 23/008 415/55.1 |
| 6,394,748 B1 * | 5/2002 | Rietschle | .............. | F04D 23/008 415/206 |
| 6,779,968 B1 * | 8/2004 | Rietschle | .............. | F04D 23/008 415/55.1 |
| 7,591,632 B2 * | 9/2009 | Baecke | ................. | F04D 29/622 415/55.1 |
| 8,662,822 B2 * | 3/2014 | Dittmar | ................. | F04D 23/008 415/55.2 |
| 2019/0242388 A1 * | 8/2019 | Krines | ................... | F04D 29/266 |

FOREIGN PATENT DOCUMENTS

| | | |
|---|---|---|
| DE | 733758 C | 4/1943 |
| DE | 839313 C | 5/1952 |
| DE | 3014425 A1 | 10/1981 |
| DE | 3128374 A1 | 2/1983 |
| DE | 3936429 A1 | 5/1991 |
| DE | 4205542 A1 | 8/1993 |
| DE | 19736678 A1 | 2/1999 |
| DE | 19850158 A1 | 5/1999 |
| DE | 102004049613 A1 | 4/2006 |
| DE | 102005042227 A1 | 3/2007 |
| DE | 102007053016 A1 | 5/2009 |
| DE | 102007053162 A1 | 5/2009 |
| DE | 102015202947 A1 | 8/2016 |
| DE | 102015224603 A1 | 6/2017 |
| EP | 1837527 A1 | 9/2007 |
| JP | S57102552 A | 6/1982 |
| JP | 2003181884 A | 7/2003 |
| JP | 2004314996 A | 11/2004 |
| JP | 2008069681 A | 3/2008 |
| WO | WO-2020104226 A1 * | 5/2020 ........... F04D 23/008 |

* cited by examiner (C - C)

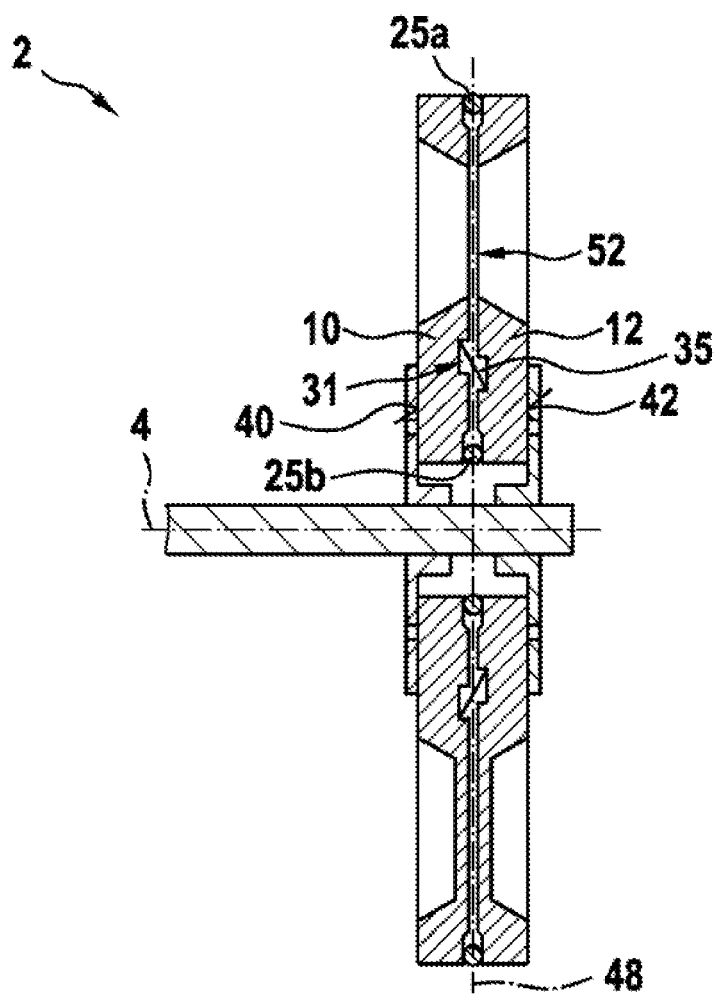

SIDE-CHANNEL COMPRESSOR FOR A FUEL CELL SYSTEM FOR CONVEYING AND/OR COMPRESSING A GASEOUS MEDIUM

BACKGROUND OF THE INVENTION

The present invention relates to a side-channel compressor for a fuel cell system for conveying and/or compressing a gaseous medium, in particular hydrogen, which is provided in particular for use in vehicles with a fuel cell drive.

In addition to liquid fuels, gaseous fuels will also play an increasing role in the vehicle sector in the future. Particularly in vehicles with fuel cell drives, there is a need to control hydrogen gas flows. In this case, the gas flows are no longer controlled discontinuously, as in the case of the injection of liquid fuel, but rather the gaseous medium is taken from at least one high-pressure tank and passed via an inflow line of a medium-pressure line system to an ejector unit. This ejector unit passes the gaseous medium via a connecting line of a low-pressure line system to a fuel cell. After the gaseous medium has flowed through the fuel cell, it is returned to the ejector unit via a return line. In this case, the side-channel compressor can be interposed, supporting the gas recirculation in terms of flow and efficiency. In addition, side-channel compressors are used to support the flow build-up in the fuel cell drive, particularly during a (cold) start of the vehicle after a certain stoppage time. These side-channel compressors are usually driven by means of electric motors, which are supplied with power via the vehicle battery when operated in vehicles.

DE 10 2007 053 016 A1 discloses a side-channel compressor for a fuel cell system in which a gaseous medium, in particular hydrogen, is conveyed and/or compressed. The side-channel compressor has a compressor impeller which rotates in a housing and is mounted on a drive shaft and is set in rotation by a drive and is thus arranged rotatably about an axis of rotation. Furthermore, the side-channel compressor has a compressor chamber situated in the housing, which compressor chamber has at least one encircling side channel. In this case, the compressor impeller has conveyor cells arranged on its circumference in the region of the compressor chamber. In addition, a gas inlet opening and a gas outlet opening are each arranged in the housing, said openings being fluidically connected to one another via the at least one side channel. In this case, the housing has a first face and a second face facing the compressor impeller, which faces each extend radially with respect to the axis of rotation. In each of these regions, an inner and an outer axial gap are formed between the housing and the compressor impeller.

There are certain possible disadvantages of the side-channel compressor known from DE 10 2007 053 016 A1. When the side-channel compressor is used, particularly as a recirculation fan, with which the compressor impeller is formed from a one-piece casting, the production costs of the compressor impeller can be correspondingly high. The high production costs are made up as follows: high raw material costs of the cast material and/or high energy costs in the production, particularly in a casting process, of the compressor impeller as a casting and/or high machining costs in the finish-machining of the compressor impeller, such as, for example, cutting and/or grinding finish-machining.

A further disadvantage of the side-channel compressor known from DE 10 2007 053 016 A1 is the large dimensions of the compressor impeller produced from the cast material. Particularly in the case of frequent starting and braking of the side-channel compressor, the compressor impeller must be continuously accelerated and/or braked in such a way that it builds up and/or reduces a corresponding rotational speed. When the compressor impeller made of cast material is used, a correspondingly high energy expenditure of the drive is necessary for this purpose, in particular in the form of electrical energy, owing to the mass of the cast material, and this in turn leads to increased operating costs of the side-channel compressor.

SUMMARY OF THE INVENTION

The invention provides a side-channel compressor embodied in such a way that a compressor impeller is of multi-part design and has a first impeller shell and a second impeller shell, wherein the impeller shells are arranged adjacent to one another, in particular axially with respect to the axis of rotation, and are each produced at least partially from a plastic. In this way, the production costs of the compressor impeller can be reduced, the reduced costs during the phases of the production process being explained below. The material costs, in particular the raw material costs, for the compressor impeller and/or the impeller shells, which consist at least partially or at least almost completely of at least one plastic, are lower than the material costs, in particular the raw material costs, of the compressor impeller made of a cast material. Furthermore, less energy, in particular electrical energy, must be used during the formation of the compressor impeller and/or of the impeller shells made of plastic, for example by means of an injection molding process, than during formation particularly by means of a casting process. Furthermore, the costs for the finish-machining of the compressor impeller and/or of the impeller shells in which plastic is used as the material are lower in comparison with the compressor impeller and/or the impeller shells made of cast material, particularly on account of the material hardness and the tool wear resulting therefrom and a temperature development during finish-machining which is disadvantageous for the compressor impeller. In this way, it is possible, on the one hand, to reduce the production costs and, in addition, the total weight and/or the total mass of the compressor impeller by using plastic instead of, for example, a cast material. Consequently, the compressor impeller thus has a lower mass moment of inertia, in particular during a rotational movement. On the one hand, this results in the advantage that the compressor impeller has improved rotational dynamics and a faster response behavior during acceleration and/or braking into and/or out of the rotational movement, in which case the desired speed change can thus be achieved more quickly. Thus, a desired operating state of the anode circuit and hence of the entire fuel cell can be brought about more rapidly. On the other hand, it is possible to achieve the advantage that the energy required, in particular the electrical energy, for driving the side-channel compressor can be reduced since less energy, in particular electrical energy, must be used for accelerating and/or braking the compressor impeller because of the lower mass moment of inertia. In this way, the total operating costs and/or the production costs of a fuel cell system can be reduced.

According to one advantageous embodiment, in addition to the impeller shells, the compressor impeller has at least one intermediate element, wherein the intermediate element is situated between the first impeller shell and the second impeller shell. Moreover, the intermediate element can be embodied as a compensating disk, wherein the compensating disk is produced at least partially from an elastic material. In this way, it is possible to achieve the advantage that an overall width of the compressor impeller, which in particular extends at least approximately parallel to the axis of rotation, undergoes virtually no change, or changes at least only slightly, even when passing through a wide temperature range, for example from −20° C. to 80° C. This advantage can be achieved inasmuch as the intermediate element is designed to be elastic in such a way that, in the event of an increase in a width of the respective impeller shell, for example due to an increase in temperature in the side-channel compressor and the resulting thermal expansion of the respective impeller shell, it is compressed in the direction of the axis of rotation and thus reduces a width of the intermediate element. Therefore, the overall width of the compressor impeller undergoes virtually no change, or at least changes only slightly, since the increase in width of the impeller shells is compensated for by the reduction in the size of the elastic intermediate element when the temperature is increased. In this way, it is possible to achieve the advantage that the at least one functionally relevant gap dimension does not change or at least changes only slightly, so that in particular there is no such widening of the functionally relevant gap dimensions that pneumatic encapsulation and/or separation of at least one side channel or of a first and a second side channel is eliminated. Thus, the reliability and/or the efficiency of the side-channel compressor can be increased or at least maintained, even when passing through a wide temperature range.

According to an advantageous development, the compressor impeller is connected to a drive shaft by means of at least two encircling driver flanges, wherein the respective driver flange is connected non-positively, in particular by means of a press fit, to the drive shaft by means of the inside diameter of said flange, radially with respect to the axis of rotation, and wherein the respective driver flange is in contact with the respective impeller shell at least approximately axially with respect to the axis of rotation. Moreover, the driver flanges are fixed on the drive shaft in such a way that they in each case exert a preloading force, which runs axially with respect to the axis of rotation, on the respective impeller shell and/or the at least one intermediate element. In this case, the respective driver flange can have at least one fixing bore, which extends at least approximately axially with respect to the axis of rotation and into which at least one fixing pin, which extends axially with respect to the axis of rotation, of the respective impeller shell projects. In this way, it is possible to achieve the advantage that the respective impeller shell is fixed positively in the direction of the axis of rotation by means of the respective driver flange and at least indirectly by means of the respective other impeller shell. Orthogonally to the axis of rotation, the respective impeller shell is, on the one hand, fixed positively by means of the fixing pin projecting into the fixing bore and, on the other hand, is additionally fixed non-positively by means of the abutment on the respective other impeller shell. This offers the advantage that, on the one hand, a high motor-side drive torque can be transmitted to the compressor impeller, in particular the impeller shells. This leads to a lower probability of failure of the entire side-channel compressor, even in the case of greatly fluctuating torques and/or excessive torque increases from the drive. On the other hand, the connection according to the invention of the compressor impeller by means of at least two driver flanges offers the advantage that the functionally relevant gap dimensions can be compensated for if there is at least one floating and/or non-locating bearing. Thus, reliable encapsulation of the at least one side channel or of the respective side channels can be achieved, thereby making it possible to improve the efficiency of the side-channel compressor. Moreover, mounting and removal of the compressor impeller on/from the shaft is simplified by the use of the driver flanges, and thus assembly and maintenance costs can be reduced.

According to a particularly advantageous embodiment, the compensating disk has at least two openings, which extend at least approximately axially with respect to the axis of rotation, wherein a fluidic connection of the side channels axially with respect to the axis of rotation is produced in the compressor impeller by the respective conveyor cell by means of the respective opening. In this way, the gaseous medium can flow at least partially in the direction of the axis of rotation from the first side channel through the conveyor cell into the second side channel, but in particular only when the compressor impeller is at a standstill or during a slow rotational movement of the compressor impeller. In this way, moreover, the desired direction and the desired state of a circulation flow can be imparted more effectively to the gaseous medium flowing axially with respect to the axis of rotation from the respective side channel, through the at least one opening, into the conveyor cell, thereby making it possible to improve the conveying action of the side-channel compressor. As a result, the delivery pressure in the compressor chamber is increased and the efficiency of the side-channel compressor can be improved. Furthermore, the double conveying effect based on having two side channels can be exploited, even if only one gas inlet opening and one gas outlet opening are provided in each case, e.g. only in a housing lower part and thus in an interrupter region of the first side channel. In the transition from the second side channel to the interrupter region, the gaseous medium can in this case flow through the respective conveyor cell and the respective openings of the compensating disk to the gas outlet opening during a rotation of the compressor impeller in the direction of the axis of rotation. Thus, the delivery volume and/or the efficiency of the side-channel compressor can be increased.

According to an advantageous development, a housing has a housing upper part and a housing lower part, wherein the housing upper part has a cylindrical collar extending around the axis of rotation, and the housing lower part has a cylindrical projection extending around the axis of rotation, and wherein the collar surrounds the projection. Moreover, a compensating gap extending radially with respect to the axis of rotation is situated axially with respect to the axis of rotation between the projection of the housing lower part and the housing upper part, and/or an adjusting disk extending radially with respect to the axis of rotation is situated axially with respect to the axis of rotation between a contact surface of the collar of the housing upper part and the housing lower part. In this case, in each case at least a gap dimension between the compressor impeller and the housing can be adjusted, in particular by means of the adjusting disk. In this way, it is possible, on the one hand, to achieve the advantage that the housing lower part can be centered in the housing upper part since the projection is guided with its outside diameter on the inside diameter of the housing upper part, thereby making it possible to reduce assembly costs. Moreover, it is possible to reduce assembly errors, for example those due to housing parts which are not optimally aligned with one another, as a result of which the probability of failure of the side-channel compressor can be reduced. Furthermore, by means of the use of the adjusting disk, it is possible to compensate manufacturing tolerances of the housing upper part and/or of the housing lower part in such a way that an optimum functionally relevant first and/or second gap dimension can be set. In this case, it is possible either to use adjusting disks with different thicknesses in the direction of the axis of rotation during assembly or it can be carried out by means of machining of the adjusting disk shortly before or during the assembly process. Finish-machining of the housing upper part and/or of the housing lower part is no longer necessary. In this way, the assembly time and/or the assembly costs can be reduced.

According to a particularly advantageous development, a gap extending radially around the axis of rotation is situated axially with respect to the axis of rotation between the impeller shells, wherein the intermediate element is embodied as at least one O-ring extending around the axis of rotation, and wherein this at least one O-ring is arranged in an enlarged gap region of the gap. In this way, a possible leakage flow orthogonal to the axis of rotation and between the two impeller shells can be prevented. This offers the advantage that no flow losses can arise in the compressor chamber, and it is thus possible to increase the efficiency of the side-channel compressor. Furthermore, the embodiment according to the invention of the side-channel compressor with the at least one O-ring extending around the axis of rotation makes it possible to prevent hydrogen escaping from the region of the compressor chamber into other regions of the side-channel compressor, something that in turn could lead to efficiency losses. Thus, the efficiency of the fuel cell system and/or of the entire vehicle can be increased by the advantageous development of the side-channel compressor.

According to an advantageous embodiment, the gap extending radially around the axis of rotation is situated axially with respect to the axis of rotation between the impeller shells, wherein the intermediate element is embodied as at least one hose-like ring, which extends around the axis of rotation and has a cavity in its interior, wherein this at least one hose-like ring is arranged in the enlarged gap region of the gap. Moreover, at least one recess is situated axially with respect to the axis of rotation in the impeller shells, wherein a spring element, in particular a Belleville spring, is arranged in said at least one recess, wherein the spring element presses the impeller shells axially away from one another and against the respective driver flange by means of a spring force. Furthermore, the housing upper part and/or the housing lower part and/or the driver flanges and/or the drive shaft are produced at least partially from a metallic material, wherein the components have an at least approximately identical coefficient of thermal expansion. In this way, it is possible to exert a constant pressing force, which is at least approximately parallel to the axis of rotation, on the respective impeller shells. In this case, the impeller shells are pressed against the respective driver flange in such a way that the overall width of the compressor impeller undergoes virtually no change or changes at least only slightly over a wide temperature range, for example from −20° C. to 80° C. In this case, a change in the width, in particular in the direction of the axis of rotation, of the respective impeller shell due to the expansion of the material in the event of a temperature change can be compensated for by the variable width of the gap. As soon as the impeller shells increase in width, the gap becomes smaller, the spring ensuring a constant pressure of the respective impeller shell against the respective driver flange. In this way, it is possible to achieve the advantage that the at least one functionally relevant gap dimension also does not change or at least changes only slightly, thus ensuring, in particular, that there is no such widening of the at least one functionally relevant gap dimension that pneumatic encapsulation and/or separation of the side channels is eliminated. Thus, the reliability and/or the efficiency of the side-channel compressor can be increased or at least maintained, even when passing through a wide temperature range.

The invention is not restricted to the illustrative embodiments described here or to the aspects emphasized herein. On the contrary, a large number of modifications that lie within the scope of action of a person skilled in the art is possible within the range indicated by the claims.

BRIEF DESCRIPTION OF THE DRAWINGS

The invention is described in greater detail below with reference to the drawing.

In the drawing:

FIG. 7 shows a schematic sectional view of the compressor impeller according to the invention in accordance with a fourth exemplary embodiment.

DETAILED DESCRIPTION

Figure 1:
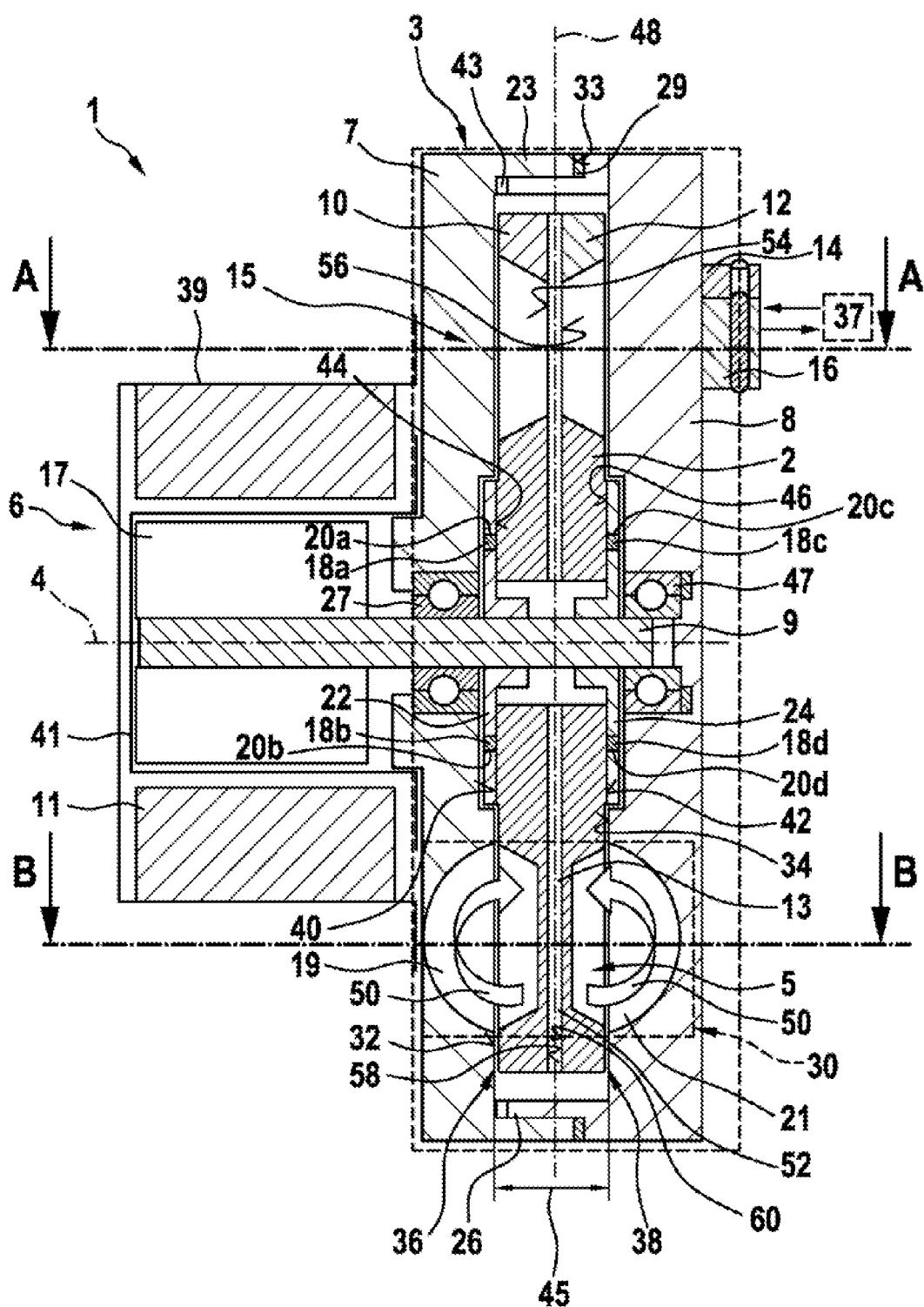
FIG. 1 shows a schematic sectional view of a side-channel compressor according to the invention and of a compressor impeller according to the invention in accordance with a first exemplary embodiment.

FIG. 1 shows a schematic sectional view of a side-channel compressor 1 according to the invention and of a compressor impeller 2 according to the invention in accordance with a first exemplary embodiment.

Here, the side-channel compressor 1 has the compressor impeller 2, which is mounted in a housing 3 so as to be rotatable about a horizontally extending axis of rotation 4. In this case, a drive 6, in particular an electric drive 6, serves as a rotary drive 6 of the compressor impeller 2, and transmission of the torque and/or of the rotary movement takes place at least indirectly from the drive 6 to the compressor impeller 2 via a drive shaft 9. In this case, the compressor impeller 2 in accordance with the first exemplary embodiment is of multi-part design and has a first impeller shell 10 and a second impeller shell 12, wherein these impeller shells are arranged adjacent to one another, in particular axially with respect to the axis of rotation 4, and a gap 52 extending radially around the axis of rotation 4 is situated axially with respect to the axis of rotation 4 between the impeller shells 10, 12. Here, the impeller shells 10, 12 can in each case be produced at least partially from a plastic. Moreover, in addition to the impeller shells 10, 12, the compressor impeller 2 has at least one intermediate element 13, 25, 57, wherein the intermediate element 13, 25, 57 is situated in the gap 52 between the first impeller shell 10 and the second impeller shell 12. In this case, the compressor impeller 2 is connected to the drive shaft 9 by means of at least two encircling driver flanges 22, 24, wherein the respective driver flange 22, 24 is connected non-positively, in particular by means of a press fit, to the drive shaft 9 by means of the inside diameter of said flange, radially with respect to the axis of rotation 4, and wherein the respective driver flange 22, 24 is in contact with the respective impeller shell 10, 12 at least approximately axially with respect to the axis of rotation 4. In this arrangement, the driver flanges 22, 24 are fixed on the drive shaft 9 in such a way that they in each case exert a preloading force, which runs axially with respect to the axis of rotation 4, on the respective impeller shell 10, 12 and/or the at least one intermediate element 13, 25, 57. The respective driver flange 22, 24 furthermore has at least one fixing bore 20*a, b, c, d*, which extends at least approximately axially with respect to the axis of rotation 4 and into which at least one fixing pin 18*a, b, c, d*, which extends axially with respect to the axis of rotation 4, of the respective impeller shell 10, 12 projects. Here, the intermediate element 13 in accordance with the first exemplary embodiment, which is shown in FIG. 1, is embodied as a compensating disk 13, wherein the compensating disk 13 is produced at least partially from an elastic material. In this case, the elastic material may be, for example, a layered composite of at least one elastomer and/or another material, e.g. steel and/or plastic.

Furthermore, the housing 3 has a first encircling side channel 19 and/or a second encircling side channel 21 in the region of a compressor chamber 30. In this arrangement, a multiplicity of conveyor cells 5 extends around the axis of rotation 4 in the compressor chamber 30 of the housing 3 in the compressor impeller 2, which chamber extends virtually completely around the axis of rotation 4. In this case, the side channels 19, 21 extend in the housing 3 in the direction of the axis of rotation 4 in such a way that they extend axially with respect to the conveyor cell 5 on both sides. Here, the side channels 19, 21 can extend around the axis of rotation 4 at least in a partial region of the housing 3, wherein an interrupter region 15 is formed in the housing 3 in the partial region in which the side channels 19, 21 are not formed in the housing 3.

One end of the drive shaft 9 is connected axially with respect to the axis of rotation 4 at least cardanically to the drive 6. In this case, a first bearing 27 is situated on the outside diameter of the drive shaft 9, axially in the region between the drive 6 and the compressor impeller 2, and a second bearing 47 is situated on the side of the compressor impeller 2 remote from the drive 6. The bearings 27, 47 may be rolling bearings 27, 47, in particular ball bearings 27, 47. Furthermore, the housing 3 forms a gas inlet opening 14 and a gas outlet opening 16. In this arrangement, the gas inlet opening 14 and the gas outlet opening 16 are connected fluidically to one another, in particular via the at least one side channel 19, 21.

As soon as the torque is transmitted from the drive 6 to the compressor impeller 2, the compressor impeller 2 is set into rotational movement, and the at least one conveyor cell 28 moves in a rotational movement around the axis of rotation 4 through the compressor chamber 30 in the housing 3. In this case, a gaseous medium already present in the compressor chamber 30 is moved along by the conveyor cell 28 and is conveyed and/or compressed in the process. Moreover, there is a movement of the gaseous medium, in particular a flow exchange, between the conveyor cell 28 and the at least one side channel 19, 21. Here, it is decisive for the conveying effect that a circulation flow 50 can form within the respective side channel 19, 21 during operation. In this case, the housing 3 has in each case a first and a second face 32, 34 radially with respect to the axis of rotation 4, said faces each facing the compressor impeller 2.

In this case, a first and a second functionally relevant gap dimension 36, 38 are formed between the housing 3 and the compressor impeller 2 in the region of the gap surfaces, which are situated in particular between the respective faces 32, 34.

By means of the functionally relevant gap dimensions 36, 38, it is ensured that the side channels 19, 21 are encapsulated and thus pneumatically separated from one another. In this case, the compressor impeller 2 and the housing 3, in particular a housing upper part 7 and/or a housing lower part 8, form a respective functionally relevant gap dimension 36, 38, which is so small that the gaseous medium cannot pass through the respective gap dimension 36, 38 and/or cannot flow past it. Here, as a rule, the aforementioned surface pairs 32, 34 have as small a clearance with respect to one another as possible. Furthermore, the gaseous medium, which is in particular an unused recirculation medium from a fuel cell system 37, flows via the gas inlet opening 14 into the compressor chamber 30 of the side-channel compressor 1 and/or is fed to the side-channel compressor 1 and/or is sucked in from the region upstream of the gas inlet opening 14. In this case, after it has passed through the gas outlet opening 16 of the side-channel compressor 1, the gaseous medium is discharged and flows back into the fuel cell system 37. Furthermore, an axis of symmetry 48 is shown which extends orthogonally to the axis of rotation 4 and symmetrically centrally through the sectional geometry of the compressor impeller 2.

Furthermore, FIG. 1 shows that the first impeller shell 10, for example, is in contact by means of a third face 40 and/or the second impeller shell 12 is in contact by means of a fourth face 42 in each case with a fifth face 44 of the first driver flange 22 and/or with a sixth face 46 of the second driver flange 24, in particular approximately axially with respect to the axis of rotation 4. Moreover, it shows that the compensating disk 13 situated between the impeller shells 10, 12 is in contact, for example, with a seventh face 54 and with a ninth face 58 of the first impeller shell 10 and/or, for example, with an eighth face 56 and with a tenth face 60 of the second impeller shell 12, in particular approximately axially with respect to the axis of rotation 4. In this case, the preloading force acting axially with respect to the axis of rotation 4 acts via the surfaces 40, 42, 44, 46, 54, 56, 58, 60 on the respective components 10, 12, 13, 22, 24 and ensures a stable assembly system of the compressor impeller 2, it also being possible for high torques on the part of the drive 6 to be transmitted to the compressor impeller 2.

FIG. 1 also shows that the housing upper part 7 has a cylindrical collar 23 extending around the axis of rotation 4, and the housing lower part 8 has a cylindrical projection 26 extending around the axis of rotation 4, wherein the lateral surface of the cylindrical projection 26, which faces away from the axis of rotation 4, faces the inner surface of the cylindrical collar 23, which faces the axis of rotation 4. In this arrangement, a compensating gap 43 extending radially with respect to the axis of rotation 4 is situated, axially with respect to the axis of rotation 4, between a front surface of the projection 26 of the housing lower part 8 and a front surface of the housing upper part 7. Furthermore, an adjusting disk 29 extending radially with respect to the axis of rotation 4 is situated, axially with respect to the axis of rotation 4, between a contact surface 33 of the collar 23 of the housing upper part 7 and a front surface of the housing lower part 8. In this case, in each case at least a gap dimension 36, 38 between the compressor impeller 2 and the housing 3 can be adjusted, in particular by means of the adjusting disk 29. In this case, the housing upper part 7 and/or the housing lower part 8 and/or the driver flanges 22, 24 and/or the drive shaft 9 are produced at least partially from a metallic material, wherein the components have an at least approximately identical coefficient of thermal expansion. Here, the metallic material may be aluminum and/or steel and/or a metallic alloy.

On account of the embodiment of the components comprising the housing upper part 7 and/or housing lower part 8 and/or the driver flanges 22, 24 and/or the drive shaft 9 from a, in particular metallic, material with an at least approximately identical coefficient of thermal expansion, these components will expand at least approximately equally in the direction of the axis of rotation 4 when the temperature is increased and contract at least approximately equally when the temperature is reduced. Since the compressor impeller 2 and, in particular, the impeller shells 10, 12 are produced at least partially from a plastic, these have a different coefficient of thermal expansion.

Thus, the width of the impeller shells 10, 12 changes differently in the event of a temperature change in comparison with the components comprising the housing upper part 7 and/or the housing lower part 8 and/or the driver flanges 22, 24 and/or the drive shaft 9. This, in turn, could lead to such widening of the respective functionally relevant gap dimension 36, 38 that the encapsulation and thus fluidic and/or pneumatic separation of the side channels 19, 21 from one another would no longer be ensured. On the other hand, in the case of a reduction in the gap dimension 36, 38 due to temperature changes and different coefficients of thermal expansion of the components of the side-channel compressor 1, the respective functionally relevant gap dimension 36, 38 could become so small that the compressor impeller 2 and the housing 3 come into contact with one another, as a result of which the components would be damaged and/or jam the compressor impeller 2 in the housing 3, and thus the side-channel compressor 1 would no longer be functional. Owing to the use of the compensating disk 13 between the two impeller shells 10, 12, wherein the compensating disk 13 is produced at least partially from an elastic material, different width changes of the components comprising the impeller shells 10, 12 in comparison with the components comprising the housing upper part 7 and/or housing lower part 8 and/or the driver flanges 22, 24 and/or the drive shaft 9 can be compensated in such a way that the compensating disk 13 is compressed and/or pulled apart at least approximately in the direction of the axis of rotation 4. In this way, an overall width 45 of the compressor impeller 2 can be adapted in such a way when passing through different temperature ranges that the functionally relevant gap dimensions 36, 38 are constant and thus independent of the temperature and the different coefficients of thermal expansion of the components of the side-channel compressor 1.

FIG. 1 also shows that the drive 6 has a rotor 17 extending axially with respect to the axis of rotation 4, wherein the rotor 17 is connected non-positively and/or positively to the drive shaft 9, in particular by means of a press fit. Encapsulation of the rotor 17 ensures that no hydrogen can pass from the side-channel compressor into the environment, which may lead, for example, to a reaction with oxygen and a detonating gas effect, which in turn could damage the side-channel compressor and/or other components of the overall vehicle. Moreover, the drive 6 has a stator 11 extending around the axis of rotation 4, wherein the stator 11 is situated around the outside of the rotor 17 and/or wherein the rotor 17 is situated inside the inside diameter of the stator 11. By energizing the stator 11, the rotor 17 can be driven and, in particular, caused to rotate. Encapsulation of the stator 11 against environmental influences and/or against moisture and contamination from the outside is achieved by the use of a stator housing 39. In this arrangement, the rotor housing 41 and/or the stator housing 39 can be fixed to the housing 3 of the side-channel compressor 1, in particular screwed to the housing.

Figure 2:
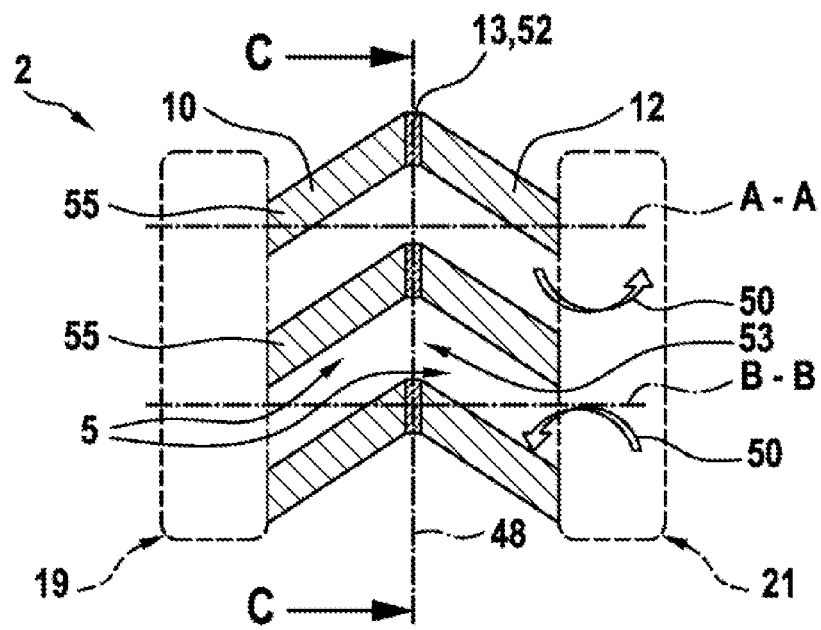
FIG. 2 shows a section, designated A-A and B-B in FIG. 1, of the impeller shells of the compressor impeller and of the conveyor cells with a compensating disk.

FIG. 2 shows a section, designated A-A and B-B in FIG. 1, of the impeller shells 10, 12 of the compressor impeller 2 and of the conveyor cells 5 with the compensating disk 13. Moreover, FIG. 2 shows the axis of symmetry 48, which extends radially with respect to the axis of rotation 4 and through the impeller 2. In this case, the gap 52 extending radially around the axis of rotation 4 extends axially with respect to the axis of rotation 4 and at the level of the axis of symmetry 48 and at least approximately parallel thereto between the impeller shells 10, 12. In this arrangement, the compensating disk 13 is arranged in this gap 52 and fills it at least almost completely. In this case, a conveyor cell 5 is formed in each case between two blades 55. Here, this at least one opening 53 in the respective impeller shell 10, 12, which extends at least approximately axially with respect to the axis of rotation 4, connects the side channels 19, 21. Furthermore, the gaseous medium can flow from the compressor impeller 2 into the respective side channel 19, 21 and/or can flow back from the respective side channel 19, 21 into the respective conveyor cell 5 of the compressor impeller 2. Furthermore, the compensating disk 13 also has at least two openings 53, which extend at least approximately axially with respect to the axis of rotation 4, the respective opening 53 of the compensating disk 13 being overlapped at least approximately completely by the respective openings 53 in the impeller shells 10, 12. In this way, by means of the respective conveyor cells 5 in the impeller shells 10, 12 and the openings 53 in the compensating disk 13, a fluidic connection of the side channels 19, 21 axially with respect to the axis of rotation 4 can be produced through the compressor impeller 2.

Here, the symmetry of the V shape of the blades 55 is mirrored symmetrically through the axis of symmetry 48. As soon as the compressor impeller 2 is set in rotation from a stationary position by means of the drive 6, a respective face of the blades 55 pushes the gaseous medium, in particular hydrogen, situated in the conveyor cell 28 in a direction of rotation from the region of the gas inlet opening 14 to the region of the gas outlet opening 16, the gaseous medium being accelerated and/or compressed. In this case, the gaseous medium is pushed in the direction of rotation out of the conveyor cell 28 away from the axis of symmetry 48 into the respective side channel 19, 21, wherein the circulation flow 50 is imparted to the gaseous medium, and wherein the gaseous medium flowing out of the conveyor cell 28 at a speed meets a slower-flowing gaseous medium in the respective side channel 19, 21. Here, this side channel flow of the medium flows more slowly than the conveyor cell flow of the medium, and a force is exerted by the medium in the conveyor cell 28 on the medium in the side channel 19, 21 on account of the resulting centrifugal force difference. In this case, a momentum exchange takes place between the two media, and energy is transferred by the gaseous medium set in circulation flow 50 to a conveying flow by momentum exchange, wherein, in particular, it is the stationary gaseous medium situated in the respective side channel 19, 21 which is affected. During this process, kinetic energy is converted into pressure energy. Here, energy transfer takes place at multiple locations over the total length of the respective encircling side channel 19, 21, and it is dependent on the number of blades 55 and conveyor cells 5.

Thus, a large energy transfer is possible between the gaseous medium situated in the conveyor cell 28 and the gaseous medium situated in the respective side channel 19, 21, and a pressure build-up takes place linearly over the circumference by momentum exchange.

In the embodiment according to the invention of the side-channel compressor 1 with the at least one side channel 19, 21, it is furthermore advantageous that, in the event of a failure of the side-channel compressor 1, the gaseous medium can continue to flow through the at least one side-channel 19, 21, even if the compressor impeller 2 is stationary, and thus there is no risk that delivery through the fuel cell system 37 will completely stop because of the failed side-channel compressor 1. This is the case particularly if a high pressure and a high delivery rate of the medium to be conveyed are maintained in the fuel cell system 37, in particular by a further component of the fuel cell system 37.

Figure 3:
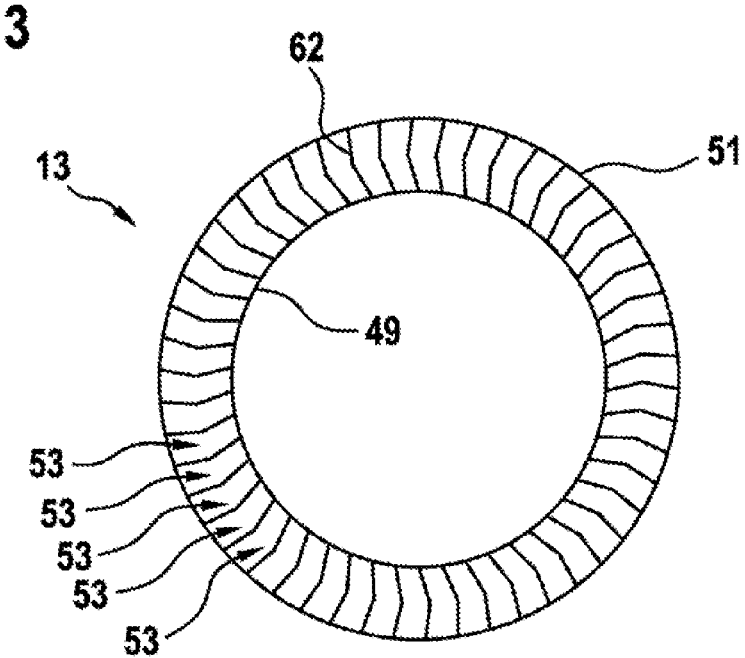
FIG. 3 shows the side view, designated C-C in FIG. 2, of the compensating disk with openings.

FIG. 3 shows a side view, designated C-C in FIG. 2, of the compensating disk 13 with at least two openings 53. In this case, the compensating disk 13 has an inner contour 49 which extends annularly around the axis of rotation 4. Furthermore, the compensating disk 13 has an outer contour 51 which extends annularly around the axis of rotation 4 and has a larger diameter than the inner contour 49. In this case, the inner contour 49 is connected to the outer contour 51 by means of at least two connecting ribs 62, wherein the connecting ribs 62 extend at least approximately radially with respect to the axis of rotation 4. Here, the arrangement of the connecting ribs 62 extends around the axis of rotation 4 between the inner contour 49 and the outer contour 51. Between the connecting ribs 62, the compensating disk 13 forms a plurality of openings 53. In this case, the faces 54, 56, extending in the direction of the axis of rotation 4, of the connecting ribs 62 are in contact with the faces 58, 60, extending in the direction of the axis of rotation 4, of the blades 55 of the respective impeller shell 10, 12.

Figure 4:
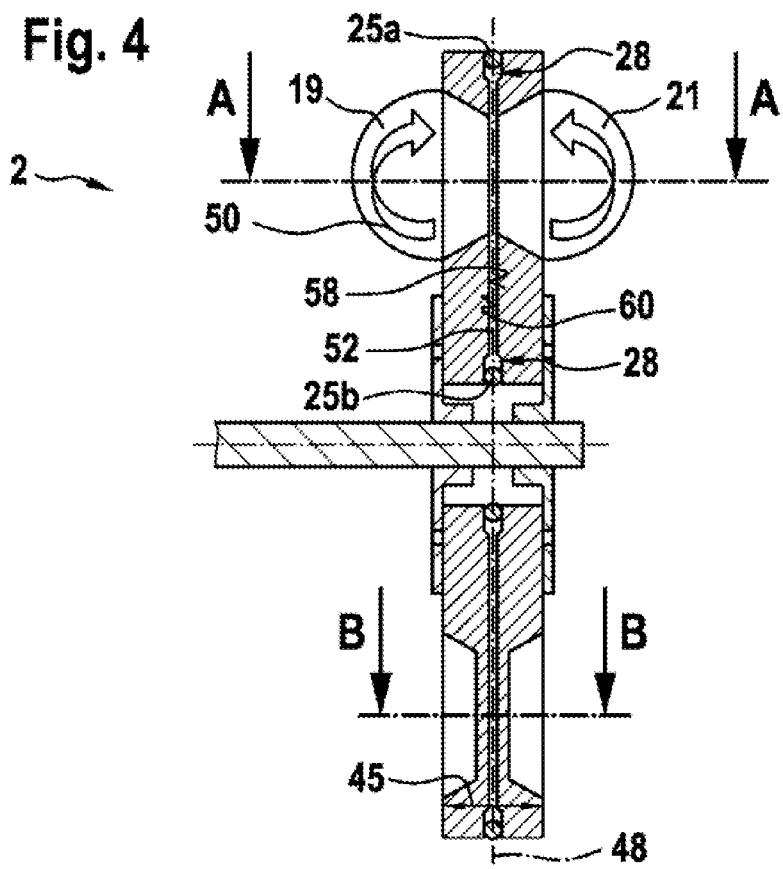
FIG. 4 shows a schematic sectional view of the compressor impeller according to the invention in accordance with a second exemplary embodiment.

FIG. 4 shows a schematic sectional view of the compressor impeller 2 according to the invention in accordance with a second exemplary embodiment. In this exemplary embodiment, the gap 52 extending radially around the axis of rotation 4 is situated axially with respect to the axis of rotation 4 between the impeller shells 10, 12, but the intermediate element 25 is embodied as at least one O-ring 25 extending around the axis of rotation 4, and wherein this at least one O-ring 25 is arranged in an enlarged gap region 28 of the gap 52. In this case, the enlarged gap region 28 is achieved by enlarging the gap 52 in the impeller shells 10, 12. In this way, a possible leakage flow orthogonal to the axis of rotation 4 and between the two impeller shells 10, 12 can be prevented. This offers the advantage that no flow losses can arise in the compressor chamber 30, and it is thus possible to increase the efficiency of the side-channel compressor 1.

In this case, an outer O-ring 25a and an inner O-ring 25b can each be located in the enlarged gap region 28 between the impeller shells 10, 12, it being possible to achieve effective pneumatic and/or hydraulic separation of the side channels 19, 21 by means of the use of the two O-rings 25a, b. In this case, the O-rings 25a, b are embodied with an elasticity such that they can be compressed and expand elastically back into the original shape. In this way, the overall width 45 of the compressor impeller 2 can be adapted in such a way when passing through different temperature ranges that the functionally relevant gap dimensions 36, 38 are constant or undergo at least virtually no change, irrespective of the temperature and/or the different coefficients of thermal expansion of the other components of the side-channel compressor 1.

Figure 5:
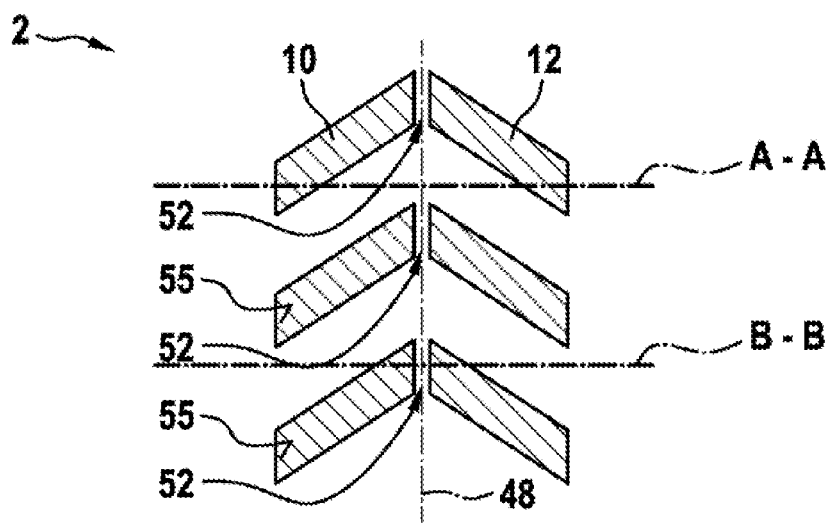
FIG. 5 shows a section, designated A-A and B-B in FIG. 4, of the impeller shells of the compressor impeller and of the conveyor cells without the compensating disk.

FIG. 5 shows a section, designated A-A and B-B in FIG. 4, of the impeller shells 10, 12 of the compressor impeller 2 and of the conveyor cells 5 without the corresponding compensating disk 13. In this case, only the gap 52 between the respective impeller shells 10, 12 is situated in the section plane shown, wherein the gap 52 runs at least parallel to the axis of symmetry 48. Here, the distance between the impeller shells 10, 12 is maintained by means of the at least one O-ring 25, which is not visible in this plane. In this case, the respective impeller shells 10, 12 are pressed against one another at least approximately parallel to the axis of rotation 4 by means of the respective driver flange 22, 24 and come into contact with one another at least indirectly via the at least one O-ring 25, although the gap 52 and/or the enlarged gap region 28 are/is formed between the driver flanges 22, 24 (shown in FIG. 4).

Figure 6:
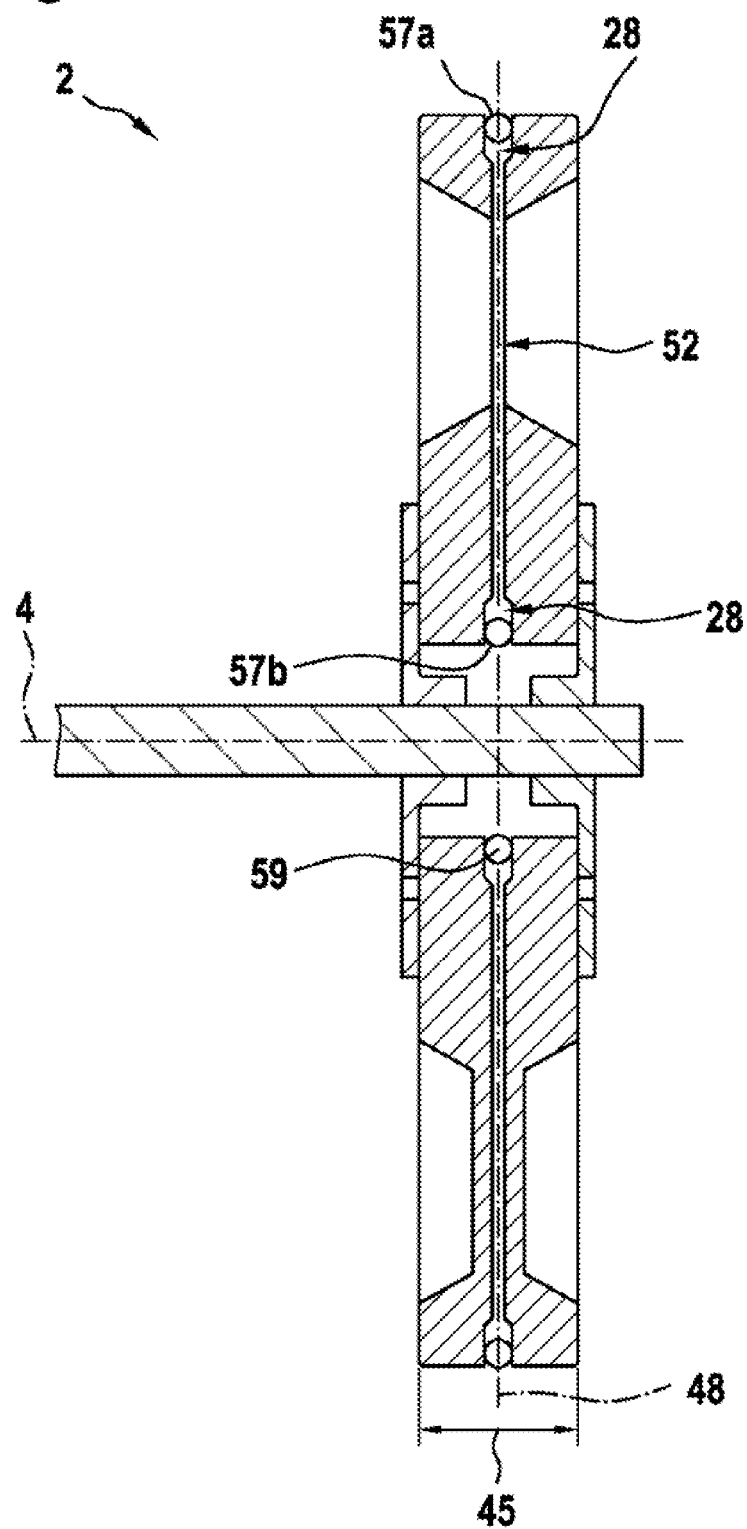
FIG. 6 shows a schematic sectional view of the compressor impeller according to the invention in accordance with a third exemplary embodiment.

FIG. 6 shows a schematic sectional view of the compressor impeller according to the invention in accordance with a third exemplary embodiment. In this case, the gap 52 extending radially around the axis of rotation 4 is situated axially with respect to the axis of rotation 4 between the impeller shells 10, 12, wherein the intermediate element 57 is embodied as at least one hose-like ring 57, which extends around the axis of rotation 4 and has a cavity 59 in its interior, wherein this at least one hose-like ring 57 is arranged in the enlarged gap region 28 of the gap 52. By virtue of the embodiment of the hose-like ring 57 with the cavity 59, a greater temperature-induced change in the width of the respective impeller shells 10, 12 can be compensated for, ensuring that the overall width 45 of the compressor impeller 2 does not change or that the overall width 45 of the compressor impeller 2 changes only in such a way that the functionally relevant gap dimensions 36, 38 remain at least virtually the same and do not increase or decrease to such an extent that the encapsulation of the side channels 19, 21 is eliminated or the compressor impeller 2 comes into contact with the housing 3.

FIG. 7 shows a schematic sectional view of the compressor impeller 2 according to the invention in accordance with a fourth exemplary embodiment. In this case, there is in each case one recess 31 axially with respect to the axis of rotation 4 between the impeller shells 10, 12, wherein a spring element 35, in particular a Belleville spring 35, is arranged in this at least one recess 31. Here, this at least one recess 31 is formed at least partially in each of the two impeller shells 10, 12 so as to extend around the axis of rotation 4, wherein the respective recess 31 can in each case be arranged in the first impeller shell 10 in a manner offset in the direction of the axis of symmetry 48 with respect to the second impeller shell 12. In this way, guidance of the spring element 35 in the compressor impeller 2 can be achieved. In this case, the spring element 35 presses the impeller shells 10, 12 axially away from one another and against the respective driver flange 22, 24 by means of a spring force. In this way, in addition to the force produced by the elasticity of the at least one O-ring 25, a further spring force can act on the impeller shells 10, 12.

What is claimed is:
1. A side-channel compressor (1) for a fuel cell system (37) for conveying and/or compressing a gaseous medium, the side-channel compressor comprising
 a housing (3), a compressor chamber (30), which is situated in the housing (3) and which has at least one encircling side channel (19, 21), a compressor impeller (2), which is situated in the housing (3) and which is arranged so as to be rotatable about an axis of rotation (4), wherein the compressor impeller (2) has conveyor cells (5) arranged on a impeller circumference in a region of the compressor chamber (30), and one gas inlet opening (14) formed on the housing (3) and one gas outlet opening (16), which are fluidically connected to one another via the compressor chamber (30), wherein the housing (3) has a respective first and second face (32, 34) each extending radially away from the axis of rotation (4), each face facing the compressor impeller (2), and wherein a first and second gap dimension (36, 38) is formed between the first and second face (32, 34) of the housing (3) and the compressor impeller (2), wherein the compressor impeller (2) has a first impeller shell (10) and a second impeller shell (12), wherein the impeller shells are arranged adjacent to one another and are each produced at least partially from a plastic, wherein the compressor wheel (2) is connected to a drive shaft (9) by means of at least two encircling driver flanges (22, 24), wherein each of the at least two encircling driver flanges (22, 24) is connected by friction connection to the drive shaft (9) by means of a respective inside diameter, the connection extending radially about the axis of rotation (4), and wherein each of the at least two encircling driver flanges (22, 24) is in contact with a respective one of the first impeller shell (10) and the second impeller shell (12) (10, 12) axially along the axis of rotation (4).

2. The side-channel compressor (1) as claimed in claim 1, wherein, in addition to the impeller shells (10, 12), the compressor impeller (2) has at least one intermediate element (13, 25, 57), wherein the at least one intermediate element (13, 25, 57) is situated between the first impeller shell (10) and the second impeller shell (12).

3. The side-channel compressor (1) as claimed in claim 2, wherein each of the at least two encircling driver flanges (22, 24) is fixed on the drive shaft (9) in such a way that each of the at least two encircling driver flanges exerts a preloading force, which runs axially with respect to the axis of rotation (4), on the respective impeller shell (10, 12) and/or the at least one intermediate element (13, 25, 57).

4. The side-channel compressor (1) as claimed in claim 1, wherein at least one of the at least two encircling driver flange (22, 24) has at least one fixing bore (20*a, b, c, d*), which extends at least axially with respect to the axis of rotation (4) and into which at least one fixing pin (18*a, b, c, d*), which extends axially with respect to the axis of rotation (4), of the respective impeller shell (10, 12) projects.

5. The side-channel compressor (1) as claimed in claim 2, wherein the intermediate element (13) is embodied as a compensating disk (13), wherein the compensating disk (13) is produced at least partially from an elastic material.

6. The side-channel compressor (1) as claimed in claim 5, wherein the compensating disk (13) has at least two openings (53), which extend at least axially with respect to the axis of rotation (4), wherein a fluidic connection of the at least one encircling side channel (19, 21) axially along the axis of rotation (4) is produced in the compressor impeller (2) by one of the conveyor cells (5) and by one of the at least two openings (53).

7. The side-channel compressor (1) as claimed in claim 2, wherein the housing (3) has a housing upper part (7) and a housing lower part (8), wherein the housing upper part (7) has a cylindrical collar (23) extending around the axis of rotation (4), and the housing lower part (8) has a cylindrical projection (26) extending around the axis of rotation (4), wherein the collar (23) surrounds the projection (26).

8. The side-channel compressor (1) as claimed in claim 7, wherein a compensating gap (43) extending radially with respect to the axis of rotation (4) is situated axially with respect to the axis of rotation (4) between the projection (26) of the housing lower part (8) and the housing upper part (7), and/or wherein an adjusting disk (29) extending radially with respect to the axis of rotation (4) is situated axially with respect to the axis of rotation (4) between a contact surface (33) of the collar (23) of the housing upper part (7) and a front surface of the housing lower part (8), wherein at least the first or the second gap dimension (36, 38) between the compressor impeller (2) and the housing (3) can be adjusted.

9. The side-channel compressor (1) as claimed in claim 2, wherein a third gap (52) extending radially around the axis of rotation (4) is situated axially with respect to the axis of rotation (4) between the impeller shells (10, 12), wherein the intermediate element (25) is embodied as at least one O-ring (25) extending around the axis of rotation (4), and wherein the at least one O-ring (25) is arranged in an enlarged gap region (28) of the third gap (52).

10. The side-channel compressor (1) as claimed in claim 2, wherein a third gap (52) extending radially around the axis of rotation (4) is situated axially with respect to the axis of rotation (4) between the impeller shells (10, 12), wherein the intermediate element (57) is embodied as at least one hose-like ring (57), which extends around the axis of rotation (4) and has a cavity (59) in its interior, wherein the at least one hose-like ring (57) is arranged in an enlarged gap region (28) of the third gap (52).

11. The side-channel compressor (1) as claimed in claim 1, wherein at least one recess (31) is situated axially with respect to the axis of rotation (4) between the impeller shells (10, 12), wherein a spring element (35) is arranged in said at least one recess (31), wherein the spring element (35) presses the impeller shells (10, 12) axially away from one another and against at least one of the at least two encircling driver flanges (22, 24) by a spring force.

12. The side-channel compressor (1) as claimed in claim 8, wherein at least one of the housing upper part (7), the housing lower part (8), at least one of the at least two encircling driver flanges (22, 24), and the drive shaft (9) is produced at least partially from a metallic material having an identical coefficient of thermal expansion as a metallic material used to produce another of the housing upper part (7), the housing lower part (8), at least one of the at least two encircling driver flanges (22, 24), and the drive shaft (9).

13. The side-channel compressor (1) as claimed in claim 12, wherein the metallic material is aluminum and/or steel and/or a metallic alloy.

14. The side-channel compressor (1) as claimed in claim 1, wherein, at least one of the at least two encircling driver flanges (22, 24) is connected by means of a press fit to the drive shaft (9) by means of the inside diameter of the at least one of the at least two encircling driver flanges, radially with respect to the axis of rotation (4).

15. The side-channel compressor (1) as claimed in claim 11, wherein the spring element (35) is a disc spring (35).

16. The side-channel compressor (1) as claimed in claim 1, wherein the gaseous medium is hydrogen.

17. A side-channel compressor (1) for a fuel cell system (37) for conveying and/or compressing a gaseous medium having a housing (3), having a compressor chamber (30), which is situated in the housing (3) and which has at least one encircling side channel (19, 21), having a compressor wheel (2), which is situated in the housing (3) and which is arranged so as to be rotatable about an axis of rotation (4), wherein the compressor wheel (2) has conveyor cells (5) arranged on its circumference within the compressor chamber (30), and having a gas inlet opening (14) formed on the housing (3) and a gas outlet opening (16), which are fluidically connected to one another via the compressor chamber (30), and the at least one side channel (19, 21), wherein the housing (3) has a respective first and second face (32, 34) each extending radially away from to the axis of rotation (4), each face facing the compressor wheel (2), and wherein a first and second clearance (36, 38) is formed between the first and second face (32, 34) of the housing (3) and the compressor wheel (2) and, wherein the compressor wheel (2) has a first impeller shell (10) and a second impeller shell (12), wherein the impeller shells are arranged abreast to one another axially with respect to the axis of rotation (4), and are each produced at least partially from a plastic, wherein in addition to the impeller shells (10, 12), the compressor wheel (2) has at least one intermediate element (13, 25, 57), wherein the at least one intermediate element (13, 25, 57) is situated between the first impeller shell (10) and the second impeller shell (12), wherein the at least one intermediate element (13) is embodied as a compensating disk (13), wherein the compensating disk (13) is produced at least partially from an elastic material.

\* \* \* \* \*